Figure 1:
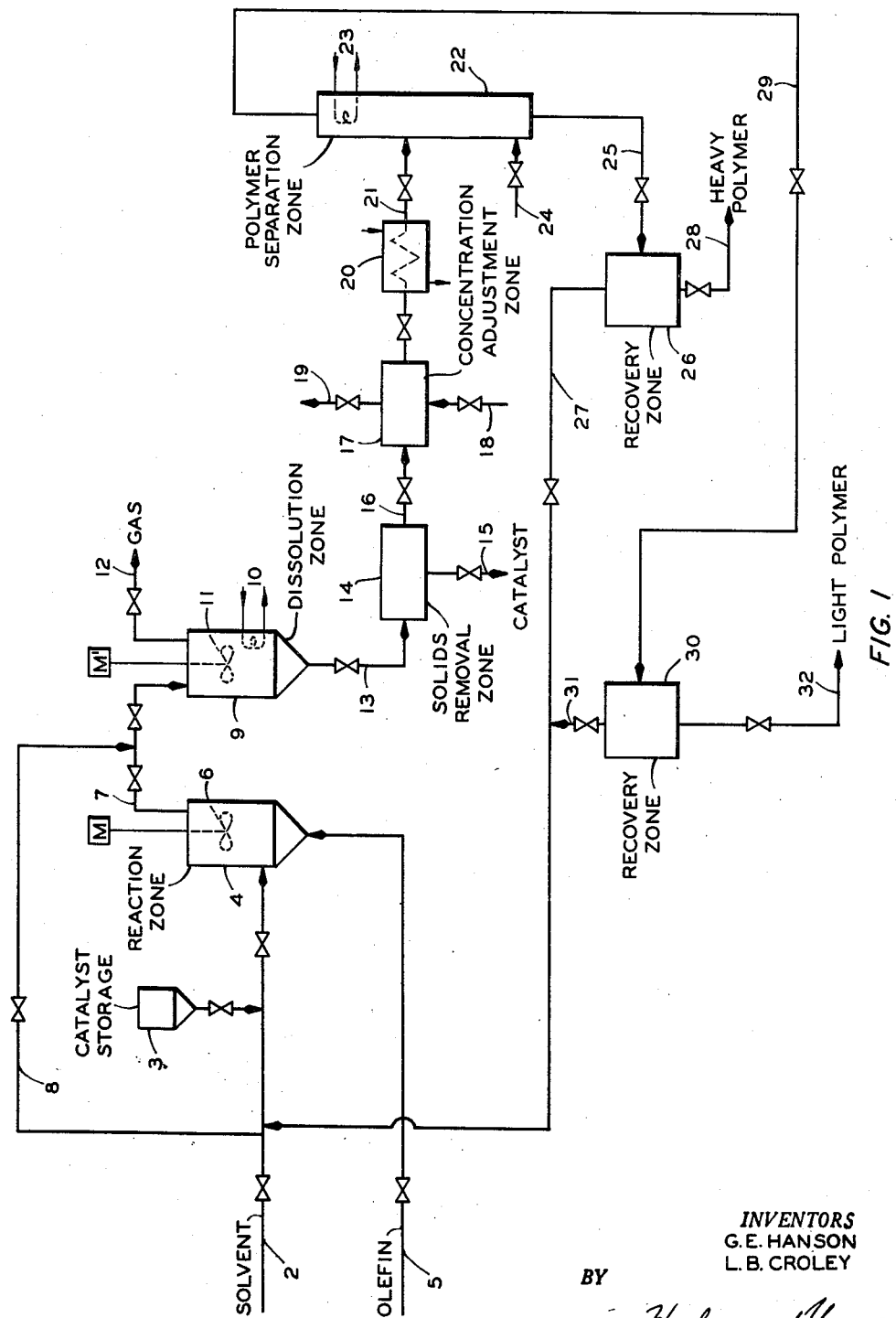

INVENTORS
G.E. HANSON
L.B. CROLEY
BY
Hudson and Young
ATTORNEYS

United States Patent Office 2,837,504
Patented June 3, 1958

2,837,504

FRACTIONATION AND RECOVERY OF POLYMERS

George E. Hanson and Leo B. Croley, Bartlesville, Okla., assignors to Phillips Petroleum Company, a corporation of Delaware Application May 23, 1955, Serial No. 510,199

18 Claims. (Cl. 260—88.1)

This invention relates to the recovery of polymers. In one aspect, it relates to a method for fractionating a polymer into two or more fractions having different properties. In another aspect, it relates to the purification of polymers.

The production of normally solid and semi-solid polymers is known in the art. For example, hydrocarbons, such as ethylene, propylene, isobutene, butadiene, and styrene, can be polymerized, either individually or in various admixtures one with another to produce solid or semi-solid polymers. The production of solid polymers of ethylene has recently assumed considerable importance. In the production of such polymers, the polymers are frequently handled in the form of solutions thereof in liquid solvents at various points in the production process, and it is important to be able to recover said polymers readily from solutions thereof. Several different recovery methods have been proposed and utilized, each of which has its own particular advantages and disadvantages, depending upon the particular circumstances of use.

The concept of cloud point and methods of determining cloud points are known in the art of hydrocarbon chemistry. Thus, a homogeneous mixture of two or more components can be cooled to a particular temperature at which the appearance of a separate phase, enriched with respect to at least one of the components, is reached. The temperature at which the appearance of such a phase is noted is generally termed the "cloud point," since it is detected by the appearance of turbidity or precipitation.

We have discovered that solutions of polymers of the type above-described, and particularly solutions of polyethylene in hydrocarbons, exhibit not only one but at least two cloud points at different temperatures. Thus, a solution of a polyethylene, and especially polyethylene of a particular type subsequently described herein, when cooled, exhibits a cloud point. However, if the same solution is heated, rather than cooled, a temperature which is higher than the previously described cloud point will ultimately be reached at which a polymer-rich phase appears. The temperature at which a polymer-rich phase separates from a solvent-rich phase on cooling can be termed a "lower cloud point" and the higher temperature at which a polymer-rich phase separates from a solvent-rich phase upon heating of a homogeneous solution can be termed the "upper cloud point."

An object of this invention is to provide a process for the recovery of polymers from solutions thereof.

Another object of this invention is to provide a process whereby a polymer can be recovered, in the fluid state, from a solution.

Another object is to provide a process for fractionating a polymer into two or more fractions having different properties.

Another object is to separate solids from polymer solutions.

Other objects and advantages will be apparent to those skilled in the art from this disclosure.

According to this invention, a solution of a polymer in a liquid solvent is heated to a temperature at least as high as the upper cloud point, and the polymer-rich phase which separates at said temperature is separated from the solvent-rich phase. Polymer can be recovered from either or both of said phases.

Further according to this invention, a polymer can be fractionated into two or more fractions having different properties, such as different molecular weights, by preparing a homogeneous solution of said polymer in a suitable solvent, heating the solution to a temperature at least as high as its upper cloud point, at which a polymer-rich phase separates from a solvent-rich phase, separating said phases from each other, and recovering polymer from each of said phases. This temperature is usually in the range 300 to 500° F., but can be outside this range.

The present invention, although not so limited, is especially applicable to the unique polymers obtained according to the copending application of Hogan and Banks, Serial No. 476,306, filed December 20, 1954. As set forth in said application in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chroium nitrate, chromium acetate, and ammonium chromate. The composite resulting from the impregnation step is dried and is then contacted for a period of several hours at a temperature of from about 900 to about 1000° F., for example, with a stream of a substantially anhydrous oxygen-containing gas, such as air. The olefin feed used for the polymerization is at least one olefin selected from the class of 1-olefins having a maximum chain length of 8 carbon atoms and no branching nearer the double bond than the 4-position. Examples of such olefins are ethylene, propylene, 1-butene, 1-pentene, and 1,3-butadiene. Copolymers, such as ethylene-propylene copolymers and ethylene-butadiene copolymers, can be prepared by the described method. The polymerization can be effected at a temperature in the range 150 to 450° F. The pressure can range from approximately atmospheric to as high as 1000 p. s. i. The polymerization can be conducted in the gaseous or in the liquid phase. A satisfactory method of conducting the polymerization comprises contacting, with the catalyst, a mixture of said olefin with a paraffinic or naphthenic hydrocarbon which can exist as a liquid at the temperature of polymerization. In such a case, the reaction pressure need be only sufficient to maintain the solvent substantially in the liquid phase and will ordinarily range from about 100 to about 700 p. s. i. When such a solvent is used, the reaction effluent comprises a mixture of solvent and polymer and, at at least one point in the process, is usually a homogeneous solution of polymer in solvent. A method for recovering the polymer from the solution is clearly desirable. The present invention effects such a recovery by heating the solution to a temperature at least as high as the upper cloud point thereof, and recovering the polymer-rich phase which precipitates at said temperature as well as the solvent-rich phase from which said polymer precipitates.

The upper cloud point of any particular polymer solution depends on the nature of the polymer, the nature of the solvent, the concentration of polymer in the solution, the molecular weight of the polymer, and other factors, so that a definite temperature range applicable to all solutions cannot be stated with complete accuracy. Nevertheless, the cloud point of any particular polymer-solvent mixture can readily be determined by those skilled in the art by mere routine test, which comprises heating the particular mixture to a temperature at which a single homogeneous liquid solution or phase, as detected by visual observation, is obtained, heating this solution at gradually increasing temperatures until cloudiness, which indicates the formation of a second liquid phase, is detected. The temperature at which the cloudiness appears is the upper cloud point. The original solution is gradually cooled, and the temperature at which the appearance of a solid polymer phase, indicated by a cloudiness in the solution, is determined; this temperature is the lower cloud point. When the solution being tested contains suspended catalyst, as when a polymerization effluent from an operation of the type subsequently described is tested, the precise detection of the cloud points is somewhat more difficult than when suspended catalyst is absent; however, they can be detected by visual observation even though suspended catalyst is present, and the detection is sufficiently accurate to enable one skilled in the art to practice the present invention. The accuracy of the determination can be increased in many cases by the use of an instrument, such as, for example, a nephelometer, a photometer, or any other instrument which measures the light absorption or the scattering effect produced by the precipitation of additional solid or liquid in a mixture. Such instruments are well known in the analytical and instrumental control arts.

The invention is of particular value when it is desired to utilize a paraffinic or isoparaffinic solvent instead of a naphthenic solvent in the polymerization zone. The invention is generally applicable to polyethylenes of the type herein described which have molecular weights in the range 1,000 to 100,000, or higher. Generally, the molecular weight of the polymer is within the range 1,000 to 200,000. However, in most cases, the molecular weights will be in the range 10,000 to 80,000, and more often 10,000 to 60,000, and the invention is of special applicability to polymers having a molecular weight in the range 25,000 to 50,000. Such polymers are ordinarily obtained by the Hogan and Banks process by utilizing the catalyst in the form of a slurry or suspension in the hydrocarbon solvent and maintaining the polymerization temperature in the range 200 to 350° F., preferably 250 to 350° F. As discussed in the cited Hogan and Banks application, the molecular weight of the polymer is dependent on the polymerization conditions, particularly the temperature, and polymer having a molecular weight from 25,000 to 50,000 is readily obtainable in the polymerization temperature range of 200 to 350° F., other reaction conditions being as previously described and including the use of a slurry catalyst. An isoparaffinic solvent which is often preferred on account of availability is 2,2,4-trimethylpentane (isooctane). This isooctane can be utilized in chemically pure form but is more often utilized as a commercial-grade hydrocarbon containing several weight percent of impurities which are preponderantly isomeric isooctanes. The concentration of polymer in the solution is usually in the range 0.1 to 15, preferably 0.2 to 10, and more preferably 0.5 to 5, weight percent. The concentration can usually be adjusted as desired by adding solvent to the reactor effluent prior to heating and catalyst filtration.

The cloud points of several polyethylene solutions are shown in the following example.

EXAMPLE I

The upper and lower cloud points of several mixtures of polyethylene and hydrocarbon solvent, with and without suspended catalyst, were determined by gradually heating until the transition temperature between a single homogeneous liquid phase and two liquid phases was obtained and subsequently by gradually cooling until the transition temperature between a homogeneous liquid phase and a liquid phase in equilibrium with a solid polymer phase was visually detected.

The polymers were obtained by catalytically polymerizing ethylene, in solution in the solvent, at a temperature in the range 250 to 350° F., in the presence of a catalyst suspended in the form of a slurry in the reaction mixture. Sufficient pressure was maintained in the reaction zone to maintain the solution predominantly in the liquid phase. The catalyst was prepared by impregnating, with an aqueous solution of chromium trioxide, a steam-aged, coprecipitated gel composite comprising 90 weight percent silica and 10 weight percent alumina, drying the resulting composite and heating in a stream of substantially anhydrous air at approximately 950° F. for approximately 5 hours. The final catalyst had a total chromium content of approximately 2 weight percent, of which approximately half was in the form of hexavalent chromium. The tested mixtures which contained catalyst corresponded, in composition, to the effluent withdrawn from the reaction vessel.

The results obtained are shown in Table I.

Table I

| Run | Polymer concentration, weight, percent | Catalyst concentration, weight, percent | Solvent | Mol. weight polymer | Cloud point, ° F. | |
|---|---|---|---|---|---|---|
| | | | | | Upper | Lower |
| 2 | Polymer + catalyst | 15–18 weight percent | i-$C_8$ | 40,000 | >340 | |
| 3 | 1.47 | 0.78 | i-$C_8$ | 43,000 | >330 | 214 |
| 4 | Polymer + catalyst | Ca. 15 weight percent | i-$C_8$ | 33,000 | >330 | <206 |
| 5 | 6.92 | 0.70 | i-$C_8$ | 33,000 | >390 | 198 |
| 6 | Not determined; very dilute | | i-$C_8$ | 33,000 | | 188 |
| 7 | 3.0 | 0 | i-$C_8$ | 40,000 | Ca. 370 | 188 |
| 8 | 5.2 | 0 | i-$C_8$ | 40,000 | Ca. 370 | 196 |
| 9 | 13.2 | 0.6 | i-$C_8$ | 47,000 | 320–350 | 202 |
| 10 | 2.0 | Trace* | i-$C_8$ | 48,000 | 350–370 | 202 |
| 11 | 5.0 | do | i-$C_8$ | 48,000 | 378 | 202 |
| 12 | 10.0 | do | i-$C_8$ | 48,000 | 378 | 202 |
| 13 | 10.0 | do | i-$C_8$ | 48,000 | 379 | 206 |
| 14 | 5.0 | do | CH | 48,000 | >400 | Ca. 175 |
| 15 | 5.0 | do | MCH | 48,000 | >400 | 181 |
| 16 | 4.07 | do | CH | 48,000 | >400 | 180 |
| 17 | 6.96 | do | CH | 39,000 | 450 | |
| | | do | CH | 39,000 | 470 | 175 | i-$C_8$—Commercial grade 2,2,4-trimethylpentane. Chief impurities are other isooctanes.
CH = 90 percent cyclohexane concentrate. Chief impurities are other close-boiling saturated hydrocarbons.
MCH = Technical grade methylcyclohexane from Dow Chemical Company.
*"Trace" = 0.408 weight percent, based on polymer + catalyst.

The following data were obtained by the use of a polyethylene having a molecular weight of about 47,000. This polyethylene was obtained by the method set forth supra, except that the reaction temperature was within the range 250 to 270° F. and the pressure was 500 p. s. i. Several isooctane solutions of the product polymer, having different concentrations, were examined for the visual determination of the upper and the lower cloud point. Results are shown in the following table.

Table II

| Polymer in solution, weight percent | Cloud point, °F. | |
|---|---|---|
| | Upper | Lower |
| 4.2 | 347 | 228 |
| 7.2 | 355 | 230 |
| 8.5 | 361 | 230 |
| 10.0 | 367 | 240 |

The foregoing data show the upper and lower cloud points of different concentrations of polyethylene in different hydrocarbon solvents.

It is believed that the foregoing data are representative of the cloud points of isooctane, cyclohexane, and methylcyclohexane solutions of polymers obtained under the conditions above indicated in the presence of a chromium oxide catalyst.

Figure 2:
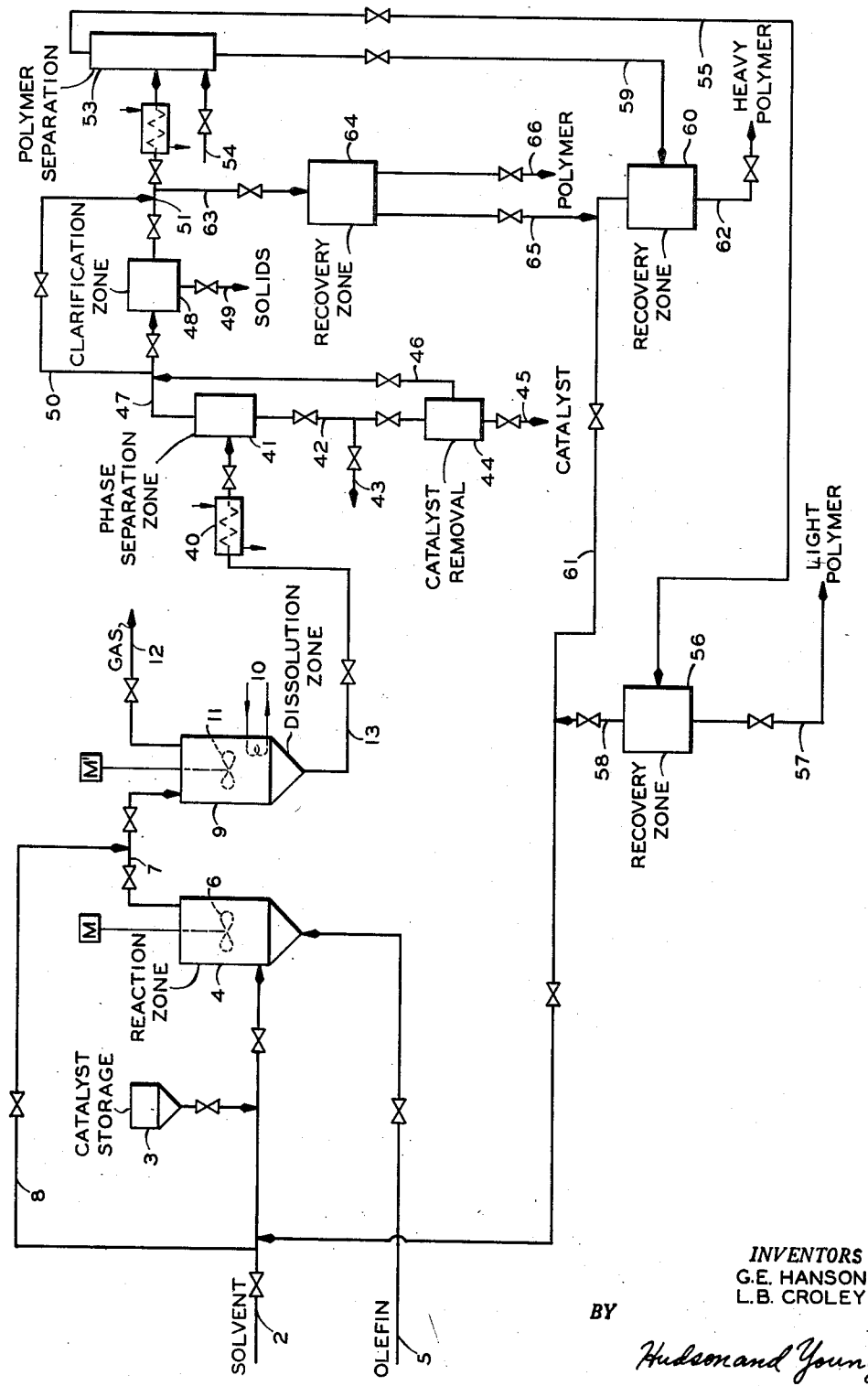

Figure 1 of the accompanying drawings is a flow sheet illustrating one embodiment of this invention; and Figure 2 is a flow sheet illustrating a second embodiment of the invention wherein the upper cloud point is utilized in a particular manner to separate suspended solids from a polymer solution.

According to Figure 1, a hydrocarbon solvent, such as isooctane, enters the system through inlet 2. A catalyst, preferably having a particle size in the range of about 40 to about 100 mesh, is added to the solvent from a suitable catalyst storage means 3. A slurry of catalyst in the solvent is thus formed and is pumped to reaction zone 4. The catalyst can be, for example, a chromium oxide-silica-alumina catalyst prepared by impregnating a 90 weight percent silica-10 weight percent alumina gel composite with chromium trioxide, drying, and heating in air, as previously described, to obtain a catalyst composite containing approximately 2.5 weight percent chromium in the form of chromium oxide, of which approximately half is in the form of hexavalent chromium. An olefin, such as ethylene, enters the system through inlet 5 and is intimately contacted with the catalyst slurry in reaction zone 4. A mechanical stirring device 6, driven by a suitable motor M, can be provided to facilitate contacting and maintain the catalyst in suspension in the reaction mixture. Reaction zone 4 can be maintained, for example, at 300° F. and 600 p. s. i. The reaction time can range from about 15 minutes to about 10 hours. The reaction zone effluent is withdrawn through conduit 7. This effluent comprises a mixture of polymer, solvent, catalyst, and small amounts of unreacted ethylene. Additional solvent can be added through line 8, if desired, to obtain a mixture having a suitable viscosity for transfer through the system. Ordinarily, the concentration of polymer is adjusted to a value in the range from about 1 to about 15 weight percent, based on polymer plus solvent. The resulting mixture passes to dissolution zone 9, wherein the mixture is heated by means of steam coil 10 and agitated by means of stirrer 11, driven by motor M', to insure complete solution of polymer in the solvent. Dissolution zone 9 is generally maintained at a temperature from 25 to 50° F. higher than reaction zone 4, a suitable temperature ordinarily being approximately 325 to 350° F. but below the upper cloud point. The pressure in dissolution zone 9 is ordinarily lower than that in reaction zone 4, e. g., about 75 to 150 p. s. i. The increased temperature and the reduced pressure can be utilized to remove any unreacted ethylene or other gas, which can be withdrawn through outlet 12. The resulting solution containing suspended catalyst passes through conduit 13 to solids removal zone 14, which can be a filter, a centrifuge, or similar equipment for the removal of solids from liquids and is operated at approximately the same temperature and pressure as dissolution zone 9. Catalyst is withdrawn from the system through outlet 15. The clarified solution is passed through conduit 16 to concentration adjustment zone 17 wherein solvent can be removed, for example, by flashing and removal through outlet 19, or added for dilution through inlet 18, if either is desired. Often, however, no further concentration adjustment is necessary when the concentration of polymer in the solvent is within the range previously set forth. The solution passes through heater 20, wherein it is heated to a temperature at least as high as the upper cloud point of the solution, which temperature, in the case of a solution of polyethylene in a paraffinic or naphthenic hydrocarbon, is generally in the range from about 300 to about 500° F. The heated mixture passes through conduit 21 to polymer separation zone 22 wherein a polymer-rich phase separates from a solvent-rich phase and settles therefrom. Polymer separation zone 22 can comprise one or more settling tanks (or centrifuges) with intermediate heaters, or a column of the type used in the propane fractionation of lubricating oils. Thus, the column can be a column having baffles to facilitate phase contact, and is ordinarily provided with a heating means, such as a steam coil 23 near the top of the column, so that a temperature gradient exists between the top and the bottom of the column, the top of the column being maintained at a higher temperature than the bottom. The pressure in polymer separation zone 22 is sufficient to maintain the solvent in the liquid or dense phase. Further fractionation can be obtained by adding additional quantities of solvent through inlet 24 so that a countercurrent contacting of the separated polymer-rich phase with fresh solvent can be obtained. The heavy or polymer-rich phase is withdrawn through outlet 25 and is passed to recovery zone 26 which is ordinarily a flash tank or other known equipment for recovery of accompanying minor amounts of solvent by vaporization. Solvent thus recovered is returned through recycle conduit 27. The heavy polymer thus recovered can be withdrawn as a product of the process through outlet 28. This polymer has a higher weighted average molecular weight than the total polymer produced and a much higher average molecular weight than the polymer remaining in the solvent-rich phase.

The solvent-rich or light phase in polymer separation zone 22 is withdrawn through conduit 29 and passed to recovery zone 30. Zone 30 can be similar to recovery zone 26 or it can comprise a series of evaporation steps. Alternatively, it can comprise cooling and filtration equipment whereby the dissolved polymer is precipitated from solution by cooling the solution to a temperature below the lower cloud point and subsequently filtering. Solvent recovered in zone 30 is recycled through conduits 31 and 27. A polymer having a lower weighted average molecular weight than the total polymer produced in the reaction and a far lower molecular weight than that recovered through outlet 28 is recovered through outlet 32.

It will be seen from the foregoing disclosure that this invention provides a method whereby polymer can be recovered from solution in a solvent in such a manner that the recovered polymer is in the form of a liquid, which can readily be transferred through a flow system. Furthermore, it will be seen that the invention provides a process wherein at least two polymers having different properties, such as different molecular weights, can be produced in the same process. The number of polymer fractions recoverable is not restricted to two. A side cut or intermediate fraction can be recovered from zone 22, if desired. Also, several stages or precipitations can be utilized by recovering the solvent-rich phase from one stage, heating to a higher cloud point temperature in a subsequent stage, and recovering the two phases produced in each precipitation stage. The properties and relative amounts of the various polymer fractions will depend on the particular temperature to which the solution is heated to produce separation of a heavy phase. Thus, at a temperature at or near the upper cloud point of the original solution, the precipitated phase will be relatively high in average molecular weight and relatively low in amount, whereas at higher temperatures, the average molecular weight of the precipitated polymer will be lower and the relative amount thereof will be higher. When a relatively high temperature is utilized in zone 22 and a relatively large amount of heavy polymer is produced, the solvent-rich phase in conduit 29 can be recycled directly, in whole or in part, through means not shown, from conduit 29 directly to recycle conduit 27, recovery zone 30 being thus by-passed.

As indicated in the foregoing discussion of Figure 1, the polymerization process of Hogan and Banks can be conducted by utilizing a finely divided mobile catalyst. When such a procedure is used, the reactor effluent contains solid catalyst in suspension and the catalyst can be removed from the liquid by filtration or other suitable methods.

Further in accordance with this invention, we have found that when a solution of polymer in solvent containing suspended solid catalyst is heated to a temperature at least as high as the upper cloud point of said solution, the suspended catalyst is markedly concentrated in the polymer-rich phase which precipitates and thus is at least partially removed from the solvent-rich phase. Thus, according to this invention, at least a preliminary removal of the suspended catalyst from the polymer solution can be obtained by heating the polymer solution containing suspended catalyst to a temperature at least as high as the upper cloud point of the solution and separating the polymer-rich phase which precipitates, the suspended catalyst or most thereof, accompanying the polymer-rich phase. The solvent-rich phase can then be processed, as previously described, and, in many cases, no filtration of this phase is necessary. When filtration is desirable, as when a small amount of suspended catalyst remains in the solvent-rich phase, the filtration is relatively easily accomplished on account of the small amount of solids present. The precipitated phase containing the catalyst can be further processed for the recovery of the precipitated polymer free of catalyst. In some cases, however, no further separation is necessary, as, for example, when the polymer is utilized for purposes in which the presence of solids admixed therewith is not deleterious as, for example, when the polymer is to be used for the fabrication of pipe which is not to be subjected to high pressures. The catalyst can be removed from the polymer, when desirable, by diluting the polymer with a suitable solvent, e. g., cyclohexane, and heating to a temperature at which the polymer dissolves. The catalyst can subsequently be filtered from the polymer solution. The volume of solution is ordinarily small as compared with the volume of the reactor effluent. When this particular embodiment of this invention is practiced, it is generally desirable that the precipitation temperature be at or near the upper cloud point of the original polymer solution so that only a relatively small amount of high molecular weight polymer is precipitated.

The foregoing embodiment of this invention is illustrated in more detail in Figure 2. Corresponding numerals in Figures 1 and 2 refer to corresponding apparatus or process elements. Thus, reaction zone 4 and dissolution zone 9 and the process steps in connection with these zones can be utilized as described in connection with Figure 1. According to Figure 2, however, the polymer solution obtained in dissolution zone 9 and containing suspended catalyst is pumped through conduit 13 and heater 40 wherein the temperature is raised to a value near or at the upper cloud point. Thus, the material can be heated to a temperature of approximately 350 to 380° F. in the case of a solution of polyethylene in 2,2,4-trimethylpentane. The mixture is then passed to phase separation zone 41, which can be a settling tank or a centrifuge, and the separated polymer phase containing most of the suspended catalyst is withdrawn through conduit 42. If desired, the withdrawn polymer can be removed from the system through outlet 43 and utilized for any desired application, as previously indicated, after removal of any accompanying solvent, for example, by flashing. Alternatively, the polymer-rich phase containing suspended catalyst can be passed to catalyst removal zone 44 wherein the polymer can be dissolved in any suitable solvent and the catalyst filtered therefrom and removed through outlet 45. The polymer can be recovered as such or it can be returned and admixed with the solution which is withdrawn from phase separation zone 41 through conduit 47.

The solvent-rich phase from separation zone 41, which phase contains little or no suspended catalyst, can be passed through conduit 47 to clarification zone 48 when it is desired to remove any remaining traces of suspended catalyst. Clarification zone 48 can be a settler, a thickener, a filter, a centrifuge, or an electrophoresis apparatus. The solids thus separated are removed through outlet 49. Alternatively, part or all of the solvent-rich phase from zone 41 can be by-passed around clarification zone 48 through conduit 50. The solution from clarification zone 48 or conduit 50 is passed through conduit 51 to polymer separation zone 53, which can be operated in a manner substantially similar to polymer separation zone 22 of Figure 1 and can comprise the same general type of apparatus. Additional solvent can be added through inlet 54, if desired. The light or solvent-rich phase separated in zone 53 is passed through conduit 55 to recovery zone 56, from which light polymer is recovered through outlet 57. Recovered solvent is passed through conduit 58 and recycled through conduit 61. Recovery zone 56 can be similar to or identical with recovery zone 30 described in connection with Figure 1.

The heavy or polymer-rich phase separated in polymer separation zone 53 is passed through conduit 59 to recovery zone 60, which is substantially similar or identical with recovery zone 26 described in connection with Figure 1. Recovered solvent is recycled through conduit 61 and heavy polymer is recovered through conduit 62.

The foregoing description illustrates the fractionation of polymer in a manner similar to that described in connection with Figure 1. However, the catalyst concentration benefits of this invention, as illustrated in Figure 2, can be realized without ultimate fractionation of the polymer. Thus, for example, the polymer solution in conduit 51 can be passed, totally or in part, through conduit 63 to recovery zone 64 wherein the total polymer can be recovered by cooling followed by filtration or by any evaporation procedure of the type previously referred to. In such a case, the total polymer is recovered through outlet 66 and the solvent is recycled through conduits 65 and 61.

In the systems of Figures 1 and 2, the catalyst-solution mixture is preferably maintained at a temperature between the upper and lower cloud points from the time the mixture leaves dissolution zone 9 until after any desired catalyst removal has been effected.

According to this invention, the solvent can be any normally liquid paraffin or naphthene hydrocarbon but is preferably selected from the group consisting of paraffins having from 7 to 9 carbon atoms per molecule and naphthenes having from 5 to 8 carbon atoms per molecule. A specially preferred group of solvents comprises $C_7$ to $C_9$ paraffins, since the upper cloud points of solutions of polyethylene in these solvents are lower than those of solutions of polyethylene in naphthenic solvents. The upper cloud points of solutions of polyethylenes produced by the Hogan and Banks process in $C_7$ to $C_9$ paraffins ordinarily are within the range 320 to 400° F. Solutions of these polyethylenes in $C_5$ to $C_8$ naphthenes ordinarily have upper cloud points within the range 400 to 500° F. or higher. Examples of $C_7$ to $C_9$ paraffins which can be utilized according to this invention are n-heptane, 2-methylhexane, 2,4-dimethylpentane, 2,3-dimethylpentane, n-octane, 2,2,4-trimethylpentane, n-nonane, and 2,2,5-trimethylhexane. Suitable naphthenes are cyclopentane, methylcyclopentane, cyclohexane, methylcyclohexane, and the dimethylcyclohexanes. Mixtures of the above solvents, e. g., a commercial isooctane fraction, can also be used.

EXAMPLE II

This example illustrates the application of the present invention to the fractionation of polyethylenes produced by polymerizing ethylene in the presence of a chromium oxide-silica-alumina catalyst. The fractionation was conducted in an electrically heated column which had a four-foot contacting section, three inches in diameter. In part of the runs, semi-circular baffles were horizontally positioned in a staggered arrangement inside the column. In other runs, no baffles were used. A 15 percent feed solution of the polymer in 2,2,4-trimethylpentane was maintained at a temperature from 330 to 340° F. Additional 2,2,4-trimethylpentane was introduced into the column near the bottom and circulated through the column at extraction temperature. After the temperature had become stabilized, the polymer solution at the previously described temperature was pumped into the column near the top, utilizing a pump previously calibrated to pump at a rate sufficient to obtain an overall polymer concentration of 5 weight percent inside the column. The polymer-rich phase settling to the bottom of the column was drawn off manually, the position of the phase interface being regulated by use of a sight glass at the bottom part of the column. The insoluble polymer-rich phase contained very little solvent. The overhead product was withdrawn into a heated flash pot from which residual polymer containing some solvent was periodically withdrawn. The solvent vapor from the top of the flash pot was condensed and recirculated through the column. The residual unvaporized material from the flash pot was cooled to room temperature and filtered to remove precipitated polymer from unvaporized solvent. The resulting polymer was freed of solvent by heating in vacuum ovens at 240° F.

The polymers which were fractionated according to the above procedure were produced by polymerization of ethylene in the presence of a 40 to 100 mesh catalyst prepared by impregnating a 90 weight percent silica-10 weight percent alumina coprecipitated gel composite with an aqueous solution of chromium trioxide, drying, and heating for several hours in a stream of anhydrous air at about 950° F. The polymerizations were conducted by contacting a mixture of ethylene and a normally liquid hydrocarbon solvent with the catalyst in the form of a slurry in the solvent at temperatures in the range 250 to 320° F. and pressures in the range 400 to 600 p. s. i. g. The total polymers had the following properties:

Table III

|  | A | B | C |
|---|---|---|---|
| Intrinsic viscosity | | | 1.762 |
| Molecular weight calculated from intrinsic viscosity | | | 43,080 |
| Melt index | 0.577 | 0.294 | 0.242 |
| Molecular weight calculated from melt index | 44,800 | 48,600 | 49,000 |
| Ash content, weight percent | | | 2.47 |
| Flexibility, by falling ball method | >72″ | >72″ | >72″ |
| Density, 20° C | 0.972 | 1.002 | 0.969 |
| Melting point, °F | 250±2 | 250±1 | 250±1 |

The data obtained by the above-described solvent fractionation of the polymers are shown in the following table.

Table IV

| Run Number | 1 | 2 | 3 | 4 | 5 | 6 | 7 |
|---|---|---|---|---|---|---|---|
| Baffles | Yes | Yes | Yes | Yes | No | No | No |
| Charge polymer see Table III | A | A | B | B | C | C | C |
| Column pressure, p. s. i. g | 120 | 120 | 120 | 120 | 130 | 130 | 400 |
| Column temperature, °F | 365 | 390 | 370 | 380 | 365 | 366 | 368 |
| Products: | | | | | | | |
| Overhead— | | | | | | | |
| Melt index | 226.1 | 1560 | 1210 | 1470 | 400 | 430 | 6.10 |
| Molecular weight from melt index | 13,400 | 7,600 | 8,300 | 7,900 | 11,500 | 11,300 | 30,000 |
| Ash content, weight percent | 0.17 | | | | | | |
| Density, 20° C | 0.965 | | | | | | |
| Melting point, °F | 249±1 | | | | | | |
| Bottoms— | | | | | | | |
| Intrinsic viscosity | | | 2.864 | 2.576 | 1.782 | 1.766 | 1.730 |
| Molecular weight from intrinsic viscosity | | | 70,020 | 62,980 | 43,570 | 43,180 | 42,300 |
| Melt index | 0.071 | 0.039 | | | 0.085 | 0.185 | 0.232 |
| Molecular weight from melt index | 57,000 | 62,000 | | | 56,800 | 51,550 | |
| Ash content | 4.39 | | | | | | |
| Flexibility, falling ball method | >72″ | >72″ | >72″ | >72″ | >72″ | >72″ | >72″ |
| Density, 20° C | 0.976 | | | | | | |
| Melting point, °F | 252±2 | | | | | | |

The yields of overhead product (lower molecular weight polymer) in the foregoing runs ranged from 25 to 45 percent, based on total polymer charged.

As indicated by the foregoing data, the upper cloud point of a solution increases as the molecular weight of the dissolved polyethylene decreases. Furthermore, higher extraction temperatures result in lower molecular weight overhead products and lower extraction temperatures result in higher molecular weight overhead products. The presence of the baffles in the column appeared to increase contacting efficiency.

The intrinsic viscosity mentioned in the above table was determined on a solution of 0.2 gram of the polymer in 50 cc. of tetralin at 130° C. See Kemp and Peters, Ind. Eng. Chem. 35, 1108 (1943) and Dienes and Klemm, J. Applied Phys. 17, 458 (June 1946). The "molecular weight calculated from intrinsic viscosity" was calculated by multiplying the intrinsic viscosity by 24,500. The melt index mentioned in the above tables was determined by ASTM method D-1238-52T. The "molecular weight calculated from melt index" was determined from an empirical correlation curve based on an experimental correlation of melt index with molecular weight.

Unless otherwise indicated, the terms "molecular weight" or "weighted average molecular weight," as utilized herein, signify molecular weight calculated from intrinsic viscosity.

The flexibility rating mentioned in the above tables was determined by the falling ball method, which comprises causing a 90-gram steel ball to fall from a measured height and strike a molded disk of the polymer 2 inches in diameter and ⅛ inch thick. The ball falls along a mechanical guide, and the height from which the ball drops is measured. The minimum height required for the ball to shatter the molded disk is taken as the rating of flexibility or resistance to shattering. The maximum height measurable according to the apparatus is 72 inches. Thus, a rating of greater than 72 inches indicates that the sample disk could not be shattered by the test method.

The density mentioned in the above tables was determined by immersion of a sample of the polymer in an organic liquid mixture having a density adjusted to be equal to that of the polymer and measurement of the density by means of a Westphal balance.

The melting points were determined by melting a sample of the polymer, allowing it to cool slowly, and plotting temperature against time to obtain a cooling curve. The temperature corresponding to a substantially horizontal plateau in the cooling curve was taken as the melting point.

EXAMPLE III

A 6 weight percent solution of a polyethylene in 2,2,4-trimethylpentane at about 300° F. was heated to approximately 320° F. This solution contained solid catalyst (subsequently described) in suspension. A heavy fluid phase was separated from the supernatant solvent-rich phase by settling. The two phases were separated. The heavier phase represented approximately 70 to 90 percent of the original total polymer.

The original solution, prepared as subsequently described, contained substantially all of the catalyst in the form of a solid suspension in the solution. After the phase separation, most of the catalyst was associated with the heavier phase which separated as described above. The remaining 10 to 30 percent of the polymer remained in solution in the solvent-rich phase, which also contained a small amount of the catalyst in suspension.

The polymer is readily recoverable from each of the above phases by evaporation of the solvent. Prior to the evaporation, the catalyst can be separated, for example, by filtration (after dilution with a solvent, e. g., cyclohexane, in the case of the heavier phase).

The polymer utilized in this example was prepared as follows:

A suspension of 0.11 pound of 20 to 30 mesh catalyst was maintained in suspension in 35.7 pounds of 2,2,4-trimethylpentane in a reactor provided with a motor-driven stirrer. A total of 7.45 pounds of ethylene was pressured into the reactor at the average rate of 0.802 pound per hour. During this time, the reactor temperature was maintained in the range 256 to 264° F. and the pressure was maintained at approximately 450 p. s. i. g.

The duration of the run was 9.3 hours. The contents of the reactor were removed and the ethylene was vented therefrom by reducing the pressure to approximately 100 p. s. i. The remaining material was then heated to approximately 300° F. (liquid phase) to obtain the mixture treated as described above. A sample of the total polymer produced had a molecular weight of 47,430, by the intrinsic viscosity method, a melting point of approximately 248 and a density at 20° C. of 0.961.

The catalyst utilized to produce the above polymer was produced by impregnating a silica-alumina composite comprising 90 percent silica and 10 percent alumina with an 0.76 molar solution of chromium trioxide in water. The silica-alumina composite was a commercial coprecipitated gel cracking catalyst which had been treated with steam at an elevated temperature for several hours. The impregnated composite was allowed to drain and was dried for one minute by infrared radiation. It was then ground to a particle size of 18 to 60 mesh. A 20 to 30 mesh fraction was separated therefrom by screening and was heated to a temperature of 950° F. over a period of approximately 7 hours and was contacted with a stream of anhydrous air at 950° F. for an additional 5 hours. The catalyst was then charged to the reactor, as previously described.

EXAMPLE IV

This example illustrates determination of cloud points.

A polyethylene having a molecular weight of 48,000 (intrinsic viscosity method), and obtained substantially as described in the preceding example, was dissolved in 2,2,4-trimethylpentane to obtain a homogeneous solution (concentration, 10 weight percent polymer) at approximately 370° F. The solution was cooled at a rate of from 4 to 5° F. per minute, the solution being stirred during cooling. When the temperature reached 205 F., cloudiness appeared in the solution, indicating the precipitation of polymer therefrom. Further cooling at approximately the same rate to a temperature of 160° F. resulted in the precipitation of further amounts of polymer. The resulting mixture was then heated at a rate approximately equal to the cooling rate. The precipitated polymer redissolved. Heating was continued at approximately the same rate until a temperature of 378° F. was reached, at which a cloudiness again appeared in the solution, which was previously clear. This latter temperature is the upper cloud point of the solution.

From the foregoing, it will be seen that we have provided a method whereby a polymer can be recovered from a solution thereof in a solvent by heating to a predetermined temperature and separating the two phases which exist at said temperature. It has also been shown that when the original solution contains suspended catalyst, the catalyst is concentrated in the heavier phase which separates at the upper cloud point. This can be utilized as a catalyst removal method. Although certain process steps, structures, and examples have been disclosed for purposes of illustration, it is clear that the invention is not limited thereto. Variation and modification within the scope of the foregoing disclosure and claims can be made by those skilled in the art. Thus, in the process illustrated in Figure 1, solids removal zone 14 and concentration adjustment zone 17 can be by-passed and the polymer phase separation which occurs in zone 22 can be utilized to effect at least a preliminary separation of the suspended catalyst from the lighter or solvent-rich phase withdrawn through conduit 29. If desired, the polymer separation can be effected at a sufficiently high temperature that most of the polymer, together with the catalyst, is precipitated and part or all of the catalyst remaining with the solvent-rich phase can be recycled, with part or all of said phase, directly to the reactor through conduit 29 and conduit 27.

The polymer need not be fractionated as a part of any particular polymerization process. A polymer, such as a solid polyethylene, from any source, can be dissolved in a solvent and fractionated as previously described.

Furthermore, the concentration of polymer in the solution utilized according to this invention can be outside the ranges specifically stated herein.

We claim:

1. A process for fractionating a normally solid polymer selected from the group consisting of polymers and copolymers of 1-olefins having a maximum chain length of 8 carbon atoms and no branching nearer the double bond than the 4 position, to obtain at least two fractions which differ from each other in physical properties, which comprises heating a solution of said polymer in a solvent selected from the group consisting of normally liquid paraffins and naphthenes to a temperature at which a polymer-rich phase separates from a solvent-rich phase and separating said phases.

2. A process for fractionating a polymer selected from the group consisting of polymers and copolymers of 1- olefins having a maximum chain length of 8 carbon atoms and no branching nearer the double bond than the 4 position, said polymer having a molecular weight of at least 1,000, to obtain at least two fractions which differ from each other in molecular weight, which process comprises preparing a homogeneous solution of said polymer in a solvent selected from the group consisting of normally liquid paraffins and naphthenes, said solution being characterized by the existence of cloud points at two different temperatures, heating said solution to a temperature at least as high as the higher of said temperatures, effecting a separation of a polymer-rich phase from a solvent-rich phase and recovering at least one of said phases.

3. A process for fractionating a normally solid polymer selected from the group consisting of polymers and copolymers of 1-olefins having a maximum chain length of 8 carbon atoms and no branching nearer the double bond than the 4 position, said polymers being obtained by polymerizing an olefin feed in the presence of a solid catalyst comprising as an essential ingredient chromium oxide containing a substantial percentage of hexavalent chromium and said polymer having a molecular weight in the range of 1,000 to 200,000, which comprises heating a solution of said polymer in a solvent selected from the group consisting of normally liquid paraffins and cycloparaffins to a temperature at which a polymer-rich phase separates from a solvent-rich phase and separating said phases.

4. A process for fractionating a mixture comprising the suspension of a particulate solid in a solution of a normally solid polymer selected from the group consisting of polymers and copolymers of 1-olefins having a maximum chain length of 8 carbon atoms and no branching nearer the double bond than the 4 position in a solvent selected from the group consisting of normally liquid paraffins and cycloparaffins, which process comprises heating said mixture to a temperature at which a polymer-rich phase separates from a solvent-rich phase, said polymer-rich phase having associated therewith the major portion of said solid, and separating said phases.

5. A process according to claim 3 wherein said 1-olefin is ethylene.

6. A process for fractionating a polyethylene having a melting point in the range 240 to 260° F., a molecular weight in the range 10,000 to 80,000 and a substantially straight-chain structure, to obtain at least two fractions which differ from each other in molecular weight, which process comprises preparing a homogeneous solution of said polyethylene in a praffinic hydrocarbon having from 7 to 9 carbon atoms per molecule, heating said solution to a temperature in the range 300 to 500° F., at which a polymer-rich phase separates from a solvent-rich phase, separating said phases, recovering a polyethylene having a relatively high molecular weight from said polymer-rich phase, and recovering a polyethylene having a relatively low molecular weight from said solvent-rich phase.

7. A process according to claim 6 wherein said solvent is 2,2,4-trimethylpentane.

8. A process, for the resolution of a solution of a polyethylene in a paraffinic hydrocarbon having from 7 to 9 carbon atoms per molecule, in which solution is suspended a particulate solid catalyst, which process comprises heating the described mixture to a temperature, in the range 300 to 500° F., at which a polymer-rich phase separates from a solvent-rich phase, a major proportion of said catalyst being concentrated in admixture with said polymer-rich phase, separating said phases, recovering polymer from said solvent-rich phase, removing said catalyst from said polymer-rich phase, and recovering polymer from said polymer-rich phase.

9. A process according to claim 4 wherein said solid is a catalyst comprising from 0.1 to 10 weight percent of chromium in the form of chromium oxide, including a substantial amount of hexavalent chromium, associated with at least one porous oxide selected from the group consisting of silica, alumina, zirconia, and thoria.

10. In a process wherein ethylene is polymerized in admixture with at least one hydrocarbon selected from the group consisting of normally liquid paraffins and naphthenes in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range 150 to 450° F., and a pressure sufficient to maintain the reaction mixture substantially in the liquid phase, and a mixture comprising said hydrocarbon, said catalyst and product polymer is obtained, the improvement which comprises heating said mixture to a temperature in the range 300 to 500° F., at which a polymer-rich phase with which a major portion of said catalyst is associated separates from a solvent-rich phase, separating said phases, removing catalyst from said polymer-rich phase, recovering polymer from said polymer-rich phase, and recovering polymer from said solvent-rich phase.

11. In a process wherein ethylene is polymerized in admixture with a paraffinic hydrocarbon solvent having from 7 to 9 carbon atoms per molecule in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range 150 to 450° F., and a pressure sufficient to maintain the reaction mixture substantially in the liquid phase, and a mixture comprising said hydrocarbon solvent, said catalyst and product polymer is obtained, the improvement which comprises heating said mixture to a temperature in the range 300 to 500° F., at which a polymer-rich phase with which a major portion of said catalyst is associated separates from a solvent-rich phase, separating said phases, removing catalyst from said polymer-rich phase, recovering polymer from said polymer-rich phase, and recovering polymer from said solvent-rich phase.

12. In a process wherein ethylene is polymerized in admixture with a naphthenic hydrocarbon solvent having from 5 to 8 carbon atoms per molecule in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range 150 to 450° F., and a pressure sufficient to maintain the reaction mixture substantially in the liquid phase, and a mixture comprising said hydrocarbon solvent, said catalyst and product polymer is obtained, the improvement which comprises heating said mixture to a temperature in the range 300 to 500° F., at which a polymer-rich phase with which a major portion of said catalyst is associated separates from a solvent-rich phase, separating said phases, removing catalyst from said polymer-rich phase, recovering polymer from said polymer-rich phase, and recovering polymer from said solvent-rich phase.

13. In a process wherein ethylene is polymerized in admixture with 2,2,4-trimethylpentane, as a solvent, in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range 150 to 450° F., and a pressure sufficient to maintain the reaction mixture substantially in the liquid phase, and a mixture comprising said trimethylpentane, said catalyst and product polymer is obtained, the improvement which comprises heating said mixture to a temperature in the range 300 to 500° F., at which a polymer-rich phase with which a major portion of said catalyst is associated separates from a solvent-rich phase, separating said phases, removing catalyst from said polymer-rich phase, recovering polymer from said polymer-rich phase, and recovering polymer from said solvent-rich phase.

14. In a process wherein ethylene is polymerized in admixture with a mixture of isooctanes, as a solvent, in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range 150 to 450° F., and a pressure sufficient to maintain the reaction mixture substantially in the liquid phase, and a mixture comprising said mixture of isooctanes, said catalyst and product polymer is obtained, the improvement which comprises heating said mixture to a temperature in the range 300 to 500° F., at which a polymer-rich phase with which a major portion of said catalyst is associated separates from a solvent-rich phase, separating said phases, removing catalyst from said polymer-rich phase, recovering polymer from said polymer-rich phase, and recovering polymer from said solvent-rich phase.

15. In a process wherein ethylene is polymerized in admixture with cyclohexane, as a solvent, in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range 150 to 450° F., and a pressure sufficient to maintain the reaction mixture substantially in the liquid phase, and a mixture comprising said cyclohexane, said catalyst and product polymer is obtained, the improvement which comprises heating said mixture to a temperature in the range 300 to 500° F., at which a polymer-rich phase with which a major portion of said catalyst is associated separates from a solvent-rich phase, separating said phases, removing catalyst from said polymer-rich phase, recovering polymer from said polymer-rich phase, and recovering polymer from said solvent-rich phase.

16. In a process wherein ethylene is polymerized in admixture with methylcyclohexane in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range 150 to 450° F., and a pressure sufficient to maintain the reaction mixture substantially in the liquid phase, and a mixture comprising said methylcyclohexane, said catalyst and product polymer is obtained, the improvement which comprises heating said mixture to a temperature in the range 300 to 500° F., at which a polymer-rich phase with which a major portion of said catalyst is associated separates from a solvent-rich phase, separating said phases, removing catalyst from said polymer-rich phase, recovering polymer from said polymer-rich phase, and recovering polymer from said solvent-rich phase.

17. In a process wherein ethylene is polymerized in admixture with n-octane, as a solvent, in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range 150 to 450° F., and a pressure sufficient to maintain the reaction mixture substantially in the liquid phase, and a mixture comprising said octane, said catalyst and product polymer is obtained, the improvement which comprises heating said mixture to a temperature in the range 300 to 500° F., at which a polymer-rich phase with which a major portion of said catalyst is associated separates from a solvent-rich phase, separating said phases, removing catalyst from said polymer-rich phase, recovering polymer from said polymer-rich phase, and recovering polymer from said solvent-rich phase.

18. A process for fractionating a polyethylene having a molecular weight in the range 1000 to 200,000, to obtain at least two fractions which differ from each other in molecular weight, which process comprises preparing a homogeneous solution of said polyethylene in a solvent selected from the group consisting of normally liquid paraffins and normally liquid naphthenes, said solution being characterized by the existence of cloud points at two different temperatures, heating said solution to a temperature at least as great as the higher of said temperatures, separating a resulting polymer-rich phase from a resulting solvent-rich phase, and recovering a polymer from at least one of said phases.

References Cited in the file of this patent

UNITED STATES PATENTS 2,529,260    Powers _____ Nov. 7, 1950

OTHER REFERENCES

Ott: "Cellulose and cellulose derivatives," pages 790–792, Interscience (1946).